SYSTEM FOR THE SUPPRESSION OF TRANSIENT NOISE PULSES

Filed June 5, 1968 2 Sheets-Sheet 1

INVENTOR.
Edwin M. Sheen
BY
Attoney

INVENTOR.
Edwin M. Sheen
BY
Roland A. Anderson
Attorney

United States Patent Office 3,555,434
Patented Jan. 12, 1971

3,555,434

SYSTEM FOR THE SUPPRESSION OF TRANSIENT NOISE PULSES

Edwin M. Sheen, Richland, Wash., assignor to the United States of America as represented by the United States Atomic Energy Commission Filed June 3, 1968, Ser. No. 733,845
Int. Cl. H03k 5/20
U.S. Cl. 328—109 5 Claims

ABSTRACT OF THE DISCLOSURE

A system for suppressing transient noise pulses in a train of data pulses applied to the system input includes a monostable multivibrator which is connected to the system input, a logic circuit which generates a system output pulse in response to anticoincidence in time of a system input pulse and an output pulse of the monostable multivibrator, and a count rate detector which varies the monostable multivibrator output pulse width in response to the system output pulse rate.

CONTRACTUAL ORIGIN OF THE INVENTION

The invention described herein was made in the course of, or under, a contract with the United States Atomic Energy Commission.

BACKGROUND OF THE INVENTION

This invention relates to noise pulse suppression systems and in particular to noise pulse suppression systems which reject noise pulses induced in a signal cable carrying data pulses.

In industrial electronic pulse systems, noise pulses are frequently induced in the signal cables by nearby power equipment such as arc welders, electric drills, sanders, and opening and closing of power switches and relay contacts. This effect is encountered at times even with properly grounded coaxial signal cables in isolated conduits with no power conductors directly in the signal cable conduit. These noise pulses are usually of a transient and oscillatory nature such that, if one pulse crosses a simple amplitude discriminator, several usually will.

Clearly such noise pulses are highly undesirable in a pulse system. For example, a counting system connected to a signal cable carrying data pulses and induced noise pulses will indicate a false high count rate.

It is therefore an object of the present invention to provide an electronic system for rejecting induced noise pulses in a signal cable carrying data pulses.

It is another object of the present invention to provide means for detecting and rejecting noise pulses in a train of data pulses when the average data pulse rate changes.

SUMMARY OF THE INVENTION

In accordance with the invention, a train of pulses is applied to the input of a variable monostable multivibrator and a first input of a logic circuit. The output of the monostable multivibrator is applied to a second input of the logic circuit. The logic circuit generates an output pulse in response to anticoincidence in time of a pulse of the train of pulses and an output pulse of the monostable multivibrator. A count rate detector varies the pulse width of the monostable multivibrator output in response to the average pulse repetition rate of the output of the logic circuit.

BRIEF DESCRIPTION OF THE DRAWINGS

A more complete understanding of the invention will best be obtained from consideration of the accompanying drawings in which.

PREFERRED EMBODIMENT OF THE INVENTION

Figure 1:
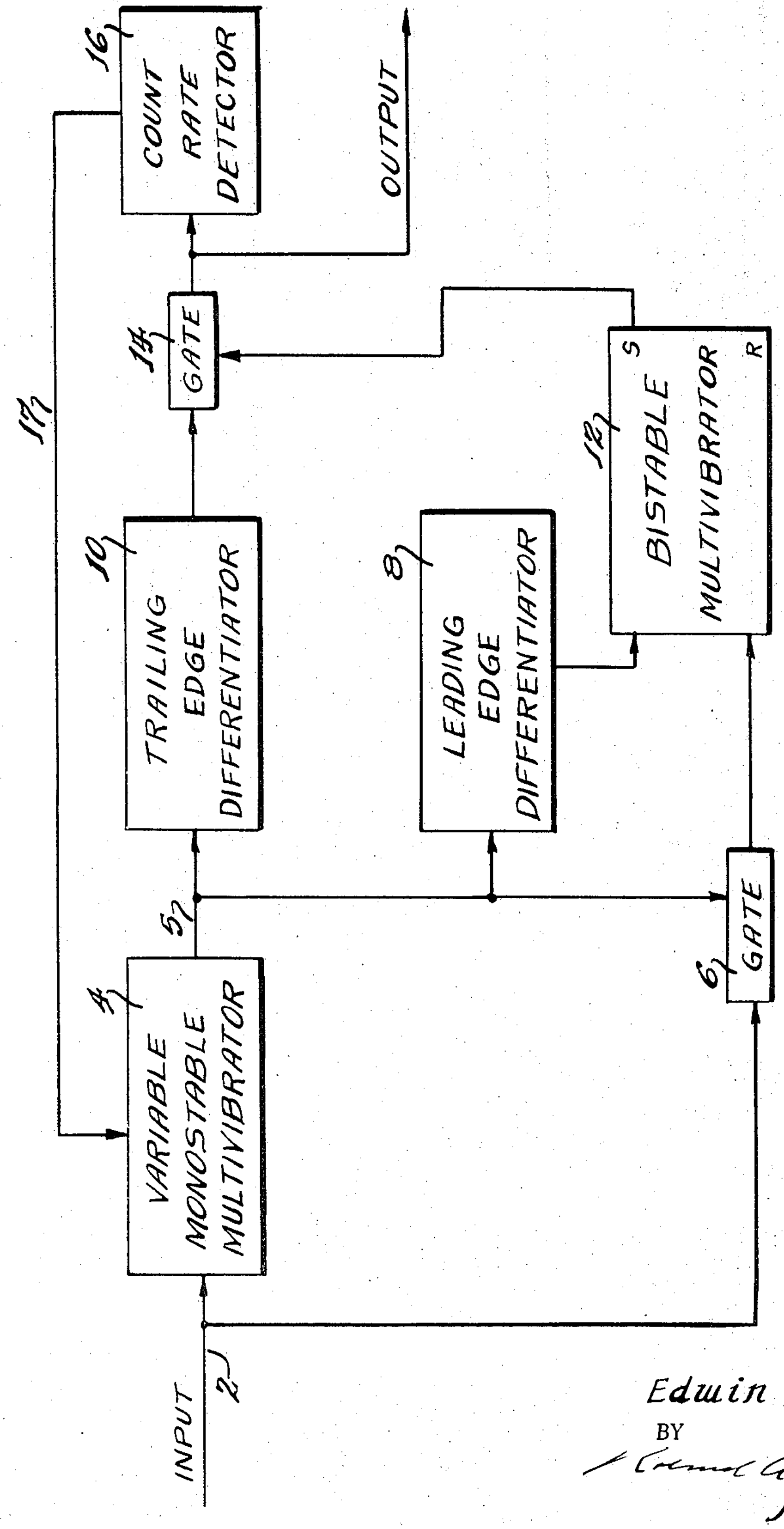
FIG. 1 is a block diagram illustrating the preferred embodiment of the invention.

FIG. 1 is a block diagram representing the noise pulse suppression system of the present invention. A signal cable 2, hereinafter referred to as line 2, carrying a sequence of pulses, such as a train of data pulses contaminated with bursts of noise pulses having a pulse repetition rate higher than the pulse rate of the data pulses, is connected to the input of a variable monostable multivibrator 4 and a first input of a two-input AND gate 6.

It is assumed that all pulses applied to the inputs of the monostable multivibrator 4 and the gate 6 have substantially the same amplitude. If the pulses in line 2 vary greatly in height, a uniform pulse height may be obtained by inserting a pulse height discriminator between the output of line 2 and the inputs of the monostable multivibrator 4 and the gate 6.

Monostable multivibrator 4 is triggered to its active state in response to the trailing edge of a pulse applied to the input thereof. Input pulses occurring during the active state have no effect on the monostable multivibrator.

The output of the monostable multivibrator 4 is connected, via a line 5, to a second input of gate 6 and the inputs of a leading-edge differentiator 8 and a trailing-edge differentiator 10. The outputs of gate 6 and the leading-edge differentiator 8 are, respectively, connected to the reset and set inputs of a bistable multivibrator 12. The output of the trailing-edge differentiator 10 and the set output of the bistable multivibrator 12 are connected to first and second inputs, respectively, of a two-input AND gate 14. The output of gate 14, constituting the output of the system, is also connected to the input of a conventional count rate detector 16. The output of count rate detector 16 is connected to a control input of monostable multivibrator 4, via a line 17.

Figure 2:
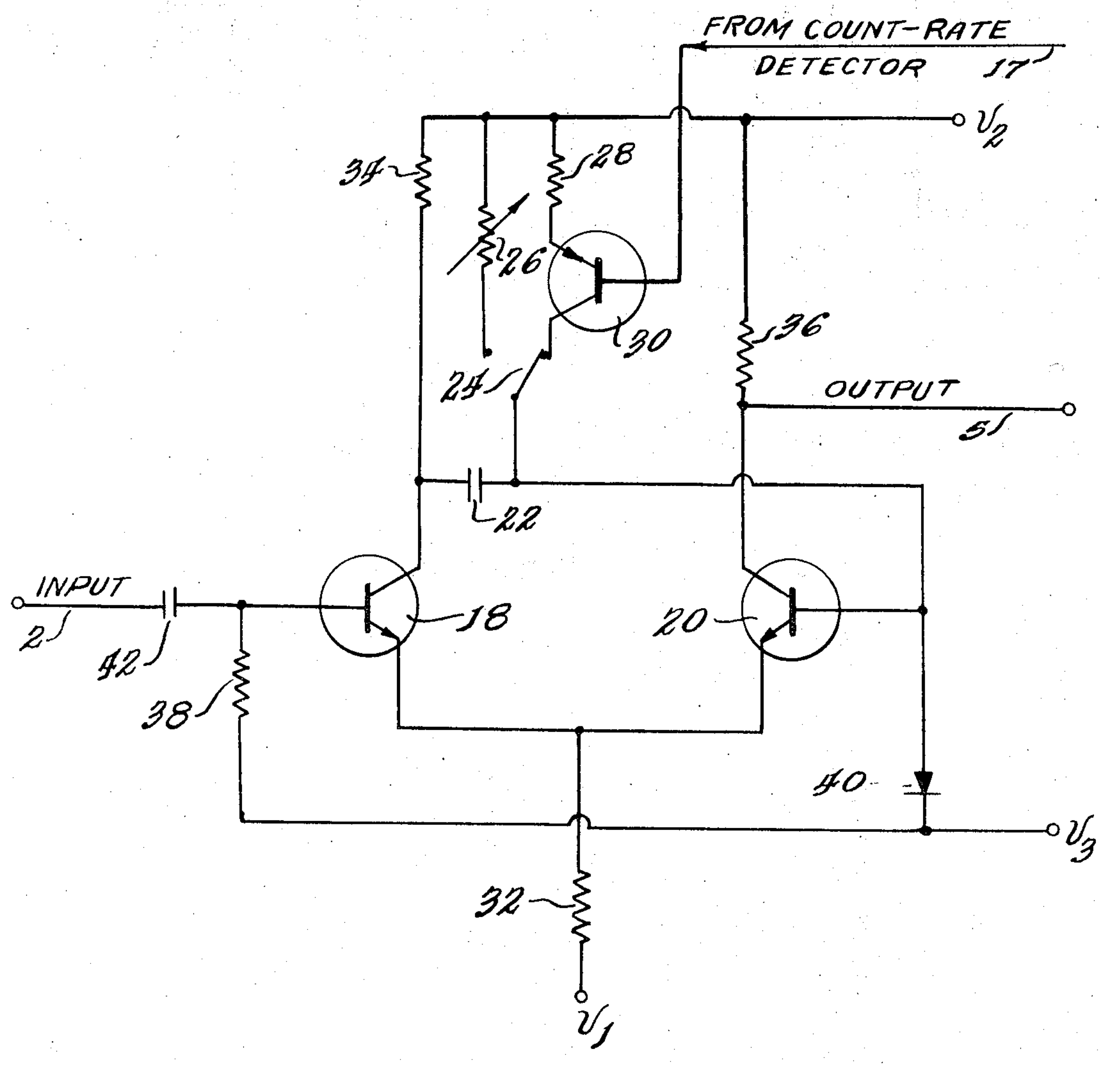
FIG. 2 is a circuit diagram of the monostable multivibrator in FIG. 1.

FIG. 2 is a circuit diagram of the monostable multivibrator 4 in FIG. 1. A transistor 18 and a transistor 20 have their emitters connected to a voltage source $V_1$, via a common resistor 32. A resistor 34 and a resistor 36 respectively connect the collectors of transistor 18 and transistor 20 to a voltage source $V_2$. A resistor 38 and a diode 40 respectively connect the bases of transistor 18 and transistor 20 to a bias voltage source $V_3$. The output 5 of the monostable multivibrator is connected to the collector of transistor 20.

An input pulse is coupled across a capacitor 42 and switches the monostable multivibrator to its active state by turning on transistor 18. The change in collector potential of transistor 18 is coupled to the base of transistor 20, via a capacitor 22, turning off transistor 20. The duration of the active state depends on the time required to recharge capacitor 22. The change in collector potential of transistor 20 on output line 5 for the duration of the active state constitutes the monostable multivibrator output pulse.

A manual switch 24 allows insertion of either a variable resistor 26 or a transistor 30 and a resistor 28 in the charging circuit of capacitor 22. In a first position of the switch 24, hereinafter referred to as the "manual control" position, recharging current is supplied to the capacitor 22 by the resistor 26, and the pulse width of the monostable multivibrator output pulse on line 5 is determined by the magnitude of the resistor 26. In a second position of the switch 24, hereinafter referred to as the "automatic control" position, recharging current is supplied to the capacitor 22 by the resistor 28 and the transistor 30, and the pulse width of the monostable multivibrator output pulse on line 5 is determined by the magnitude of the output of the count rate detector 16 in FIG. 1, which controls the amount of current flow through transistor 30, via line 17 connected to the base of transistor 30.

Assuming that the switch 24 in FIG. 2 is in the "automatic control" position, and that the pulse width of each of the monostable multivibrator 4 output pulses is equal to $\Delta T$ sec., operation of the system is as follows.

The trailing edge of a pulse from line 2 in FIG. 1 triggers the monostable multivibrator 4 which generates a pulse on line 5 with a pulse width of $\Delta T$ sec. Since gate 6 only passes a pulse from line 2 in response to time coincidence of a pulse from line 2 and a pulse of the monostable multivibrator 4, gate 6 has no output at this time.

In response to the leading edge of the monostable multivibrator output pulse, differeniator 8 generates an output pulse which triggers bistable multivibrator 12 to the set state, thereby partially enabling gate 14. Differentiator 10 generates an output pulse in response to the trailing edge of the monostable multivibrator output pulse. If no other pulse from line 2 occurs during the pulse width, $\Delta T$, of the monostable multivibrator 4 output pulse, the output pulse of differentiator 10 passes gate 14 as an output pulse of the system. If, however, another pulse from line 2 occurs during the pulse width, $\Delta T$, of the monostable multivibrator output pulse, no differentiator 10 output pulse can pass gate 14, since a pulse from line 2 during $\Delta T$ passes gate 6 and resets bistable multivibrator 12 thereby disabling gate 14.

Thus, the system only passes pulses which have a pulse separation greater than the pulse width of the monostable multivibrator 4 output pulses. Also, the system rejects any input pulse along with the next succeeding pulse spaced closer than the pulse width of the monostable multivibrator 4 output pulses.

The system output pulses of gate 14 are also fed to the count rate detector 16 which generates an output voltage proporional to the average system output pulse repetition rate. The output of the count rate detector 16 controls the current flow through transistor 30 to capacitor 22 in FIG. 2, via line 17, thereby controlling the pulse width of the monostable multivibrator 4 output pulse.

Thus a voltage proportional to the average system output pulse repetition rate is fed back to decrease or increase the pulse width of the monostable multivibrator 4 output pulse as the average system output pulse rate increases or decreases, respectively.

If it is desired to operate the system with a constant monostable multivibrator output pulse width, switch 24 in FIG. 2 is set to the "manual operation" position and resistor 26 is adjusted to produce the desired monostable multivibrator output pulse width.

If the pulses on line 2 are data pulses contaminated with bursts of noise pulses and it is desired to count these data pulses, the use of the system in suppressing these bursts of noise pulses may be illustrated by the following consideration.

If the average data pulse repetition rate is low, the data pulses are paired closely together only for a very small percentage of the pulses. For example, if the average data pulse repetition rate is 10 counts per second, the average data pulse spacing in time is 0.1 second with only approximately 1% of the data pulses spaced as closely as 1 millisecond. It is frequently required to count data pulses over a very wide dynamic range of data pulse repetition rates, say 1 to $10^5$ counts/sec., and to minimize error due to resolution losses, the pulse pair resolution time should be made as small as possible. If, then, a burst of transient noise pulses spaced a few microseconds apart arrives at a counting system each noise pulse will be counted, causing errors that are more serious at low average data pulse repetition rates.

In the present noise pulse suppression system of the invention, any pulse along with the next succeeding pulse spaced closer than $\Delta T$ is rejected, where $\Delta T$ is chosen to provide acceptable resolution losses over the entire dynamic range of the data pulse repetition rate. Thus, if a 1% resolution loss is acceptable, the count rate detector 16 in FIG. 1 is calibrated to generate an output voltage which produces a monostable multivibrator output pulse width $\Delta T$ equal to 1 millisecond for an average count rate of 10 counts/sec.

Persons skilled in the art will, of course, readily adapt the general teachings of the invention to embodiments other than the specific embodiment illustrated. Accordingly, the scope of the protection afforded the invention should not be limited to the particular embodiment shown in the drawings and described above, but shall be determined only in accordance with the appended claims.

The embodiments of the invention in which an exclusive property or privilege is claimed are defined as follows:

1. A device for detecting pulses having a time interval therebetween greater than a predetermined time interval and being contained in a pulse train comprising:

means for generating a first pulse having a pulse width equal to said predetermined time interval in response to the trailing edge of a pulse applied to the input thereof;

means for generating a second pulse in response to the trailing edge of said first pulse;

means for generating a signal responsive to anticoincidence in time of each of said first pulses and a pulse applied to the input of said first pulse generating means;

means for applying said pulse train to the input of said first pulse generating means; and means for generating an output pulse responsive to time coincidence of said second pulse and said signal.

2. The device according to claim 1 wherein said first pulse generating means includes means for varying the pulse width of said first pulse.

3. The device according to claim 1 further including means for controlling the pulse width of said first pulse responsive to the pulse rate of said output pulses.

4. A device for detecting pulses having a time interval therebetween greater than a time interval which is a predetermined function of the pulse rate of the detected pulses and being contained in a train of randomly occurring pulses, comprising:

a variable monostable multivibrator, including an input coupled to said train of pulses, for generating responsive to the trailing edge of a pulse in said train of pulses a first pulse having a leading and a trailing edge;

a first AND gate, including first and second inputs coupled to said train of pulses and the output of said monostable multivibrator, respectively, for generating an output pulse in response to time coincidence of a pulse in said train of pulses and said first pulse;

a first differentiator, including an input coupled to the output of said monostable multivibrator for generating an output pulse in response to the leading edge of said first pulse;

a second differentiator, including an input coupled to the output of said monostable multivibrator, for generating an output pulse in response to the trailing edge of said first pulse;

a bistable multivibrator, including a set and reset input coupled to the output of said second differentiator and the output of said first AND gate, respectively, and a set output; and a second AND gate, including first and second inputs coupled to the output of said first differentiator and the set output of said bistable multivibrator, respectively, for generating an output pulse in response to time coincidence of the set state of said bistable multivibrator and an output pulse of said first differentiator.

5. The device according to claim 4 further including:

a count rate detector, having its input coupled to the output of said second AND gate, for generating an output signal proportional to the average output pulse repetition rate of said second AND gate; and means for coupling the output of said count rate detector to said monostable multivibrator to control the output pulse width thereof.

References Cited

UNITED STATES PATENTS

| | | | |
|---|---|---|---|
| 2,576,975 | 12/1951 | Smith, Jr. | 328—109 |
| 3,122,647 | 2/1964 | Huey | 328—112X |
| 3,146,432 | 8/1964 | Johnson | 307—233X |
| 3,171,892 | 3/1965 | Pantle | 328—111X |
| 3,184,606 | 5/1965 | Ovenden et al. | 307—233 |
| 3,226,577 | 12/1965 | Azuma et al. | 307—234 |
| 3,304,437 | 2/1967 | Dano | 307—271 |
| 3,328,602 | 6/1967 | Taylor | 328—112X |
| 3,387,221 | 6/1968 | Arberman | 307—234X |

STANLEY D. MILLER, Jr., Primary Examiner

U.S. Cl. X.R.

307—232, 234, 271, 273; 328—112, 140